US012575605B2

(12) United States Patent
Loveday

(10) Patent No.: US 12,575,605 B2
(45) Date of Patent: Mar. 17, 2026

(54) AEROSOL GENERATING DEVICE WITH A SEALED CHAMBER FOR ACCOMMODATING A BATTERY

(71) Applicant: JT International SA, Geneva (CH)

(72) Inventor: Peter Loveday, Epsom (GB)

(73) Assignee: JT International SA (CH)

( * ) Notice: Subject to any disclaimer, the term of this patent is extended or adjusted under 35 U.S.C. 154(b) by 505 days.

(21) Appl. No.: 18/020,550

(22) PCT Filed: Aug. 9, 2021

(86) PCT No.: PCT/EP2021/072157
§ 371 (c)(1),
(2) Date: Feb. 9, 2023

(87) PCT Pub. No.: WO2022/034020
PCT Pub. Date: Feb. 17, 2022

(65) Prior Publication Data
US 2023/0346015 A1 Nov. 2, 2023

(30) Foreign Application Priority Data
Aug. 10, 2020 (EP) ..................................... 20190246

(51) Int. Cl.
*A24F 40/40* (2020.01)
*A24F 40/10* (2020.01)
(Continued)

(52) U.S. Cl.
CPC .............. *A24F 40/40* (2020.01); *A24F 40/10* (2020.01); *F16J 15/102* (2013.01);
(Continued)

(58) Field of Classification Search
None
See application file for complete search history.

(56) References Cited

U.S. PATENT DOCUMENTS

| | | | |
|---|---|---|---|
| 11,831,155 B2 * | 11/2023 | Leadley | H01M 10/42 |
| 2013/0340779 A1 * | 12/2013 | Liu | A24F 40/44 |
| | | | 131/329 |

(Continued)

FOREIGN PATENT DOCUMENTS

| | | | |
|---|---|---|---|
| CN | 207306085 U | * | 5/2018 |
| WO | 2017163050 A1 | | 9/2017 |
| WO | WO-2021220392 A1 | * 11/2021 | A24F 40/40 |

OTHER PUBLICATIONS

CN-207306085-U English Translation obtained from espacenet, pp. 1-7 (Year: 2018).*

(Continued)

*Primary Examiner* — Philip Y Louie
*Assistant Examiner* — Madeleine P Delacruz
(74) *Attorney, Agent, or Firm* — Lerner David LLP

(57) ABSTRACT

The present invention relates to an aerosol generating device for delivering aerosol upon heating a liquid contained in the device including: an outside casing comprising a battery and a receiving cavity extending in an axial direction of the device; the receiving cavity being arranged for receiving a cartomizer at a first end of the device and supplying electrical power to the cartomizer, an internal frame for holding the battery in the outside casing, at least one electronic circuit board (PCBA), wherein the aerosol generating device further includes a sealed compartment in a region of the outside casing containing the battery; the sealed compartment being sealed by a leak-tight and pressure resistant sealing arrangement isolating the battery from the receiving cavity and from the at least one electronic circuit board.

19 Claims, 4 Drawing Sheets

(51) Int. Cl.

| | |
|---|---|
| *F16J 15/10* | (2006.01) |
| *H01M 50/202* | (2021.01) |
| *H01M 50/24* | (2021.01) |
| *H01M 50/242* | (2021.01) |
| *H01M 50/247* | (2021.01) |
| *H01M 50/284* | (2021.01) |
| *H01M 50/291* | (2021.01) |

(52) U.S. Cl.
CPC ......... *H01M 50/202* (2021.01); *H01M 50/24* (2021.01); *H01M 50/242* (2021.01); *H01M 50/247* (2021.01); *H01M 50/284* (2021.01); *H01M 50/291* (2021.01); *H01M 2220/30* (2013.01)

(56) References Cited

U.S. PATENT DOCUMENTS

| | | | |
|---|---|---|---|
| 2019/0037926 A1 | 2/2019 | Qiu | |
| 2019/0246693 A1* | 8/2019 | Nettenstrom | A24F 40/485 |
| 2019/0364968 A1 | 12/2019 | Fu et al. | |
| 2022/0285785 A1* | 9/2022 | Hupkes | H01M 50/35 |

OTHER PUBLICATIONS

WO-2021220392-A1 English translation obtained from Espacenet, pp. 1-28 (Year: 2021).*
International Search Report for Application No. PCT/EP2021/072157 mailed Nov. 16, 2021, 3 pages.

\* cited by examiner

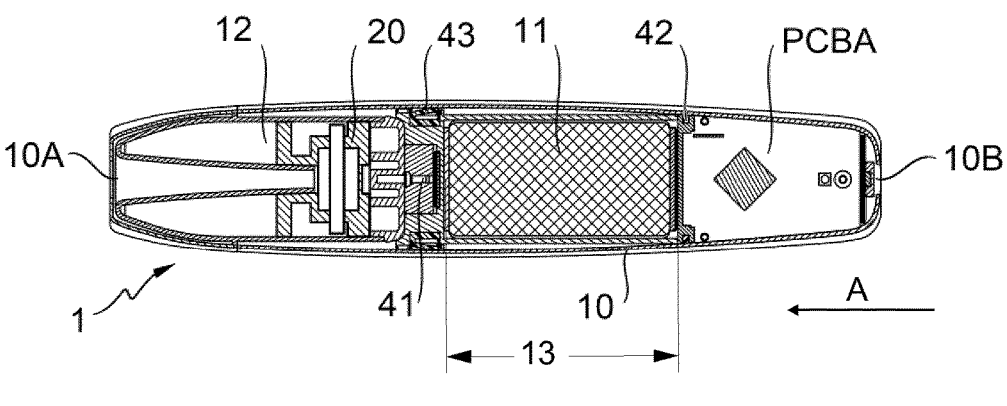
Fig. 2
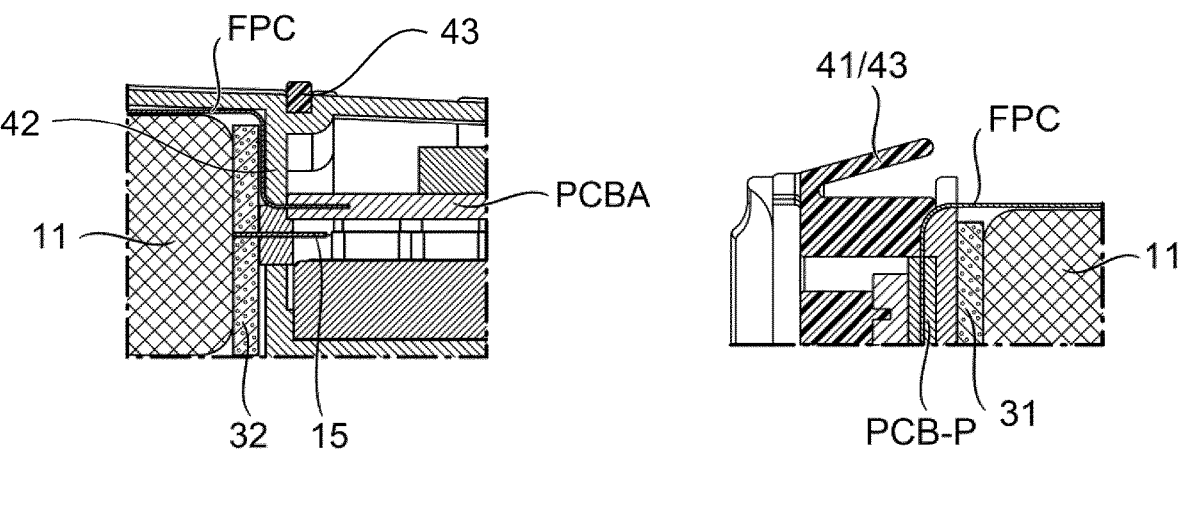
Fig. 3                                      Fig. 4

1

40

41

30

FPC

11

1

16

20

40

11

30

AEROSOL GENERATING DEVICE WITH A SEALED CHAMBER FOR ACCOMMODATING A BATTERY

CROSS-REFERENCE TO RELATED APPLICATIONS

The present application is a national phase entry under 35 U.S.C. § 371 of International Application No. PCT/EP2021/072157, filed Aug. 9, 2021, published in English, which claims priority to European Application No. 20190246.7, filed Aug. 10, 2020, the disclosures of which are incorporated herein by reference.

CROSS REFERENCE

Any features essential to the European patent applications titled "AEROSOL GENERATING DEVICE", "SHOCK ABSORPTION IN A HANDHELD AEROSOL GENERATION DEVICE", "AEROSOL GENERATING DEVICE" and "AEROSOL GENERATING DEVICE WITH LIP SEAL FOR BATTERY DEGASSING MITIGATION" all filed Aug. 10, 2020 having application numbers 20 190 248.3, 20 190 300.2, 20 190 249.1 and 20 190 247.5, as well as the corresponding PCT applications all filed Aug. 9, 2021, such as the claims thereof, and/or contained therein and corresponding to and/or relating to features of the present application are incorporated herein by this reference and can be combined with feature combinations disclosed herein in order to provide an improved aerosol generating device, and protection may be sought for the resulting feature combinations.

TECHNICAL FIELD

The present invention relates to an aerosol generating device, in particular an electronic cigarette or vaporizer, with a sealed compartment for accommodating a battery.

TECHNICAL BACKGROUND

Aerosol generating devices, such as electronic cigarettes or "e-cigarettes" as they are also known, have gained in popularity over the past ten years as an alternative to traditional smoking articles, like cigarettes, cigars, and cigarillos. Developments in the design and configuration of such aerosol generating devices or vaporizer devices are on-going to improve their performance and their reliability, as well as their ease of production and their production costs.

Conventional aerosol generating devices usually include a heater powered by an electrical power source and a liquid reservoir containing flavoured liquid that can be volatized using the heater and transferred to a user of the aerosol generating device in an airflow, which is preferably guided through a mouthpiece of the device.

Such devices are usually powered by a battery installed inside a housing. To protect the battery from external influences like dust or humidity, the battery is preferably surrounded by protection walls.

However, in some rare cases, it has happened that the battery overheats and emits high pressure gases or leaks electrolyte, which can harm the user when accidently inhaled or damage the functionality of a PCB (printed circuit board) of the device. Yet, due to the desire to locate the battery in the centre of the device, it is necessary to provide a sealing at both ends of the battery. In order to facilitate total sealing, consideration must also be paid to the electrical connections of the battery as well as the power connection to a cartomizer, in particular to a heater, and a potential user interface. Protection of the consumer is of primary concern, however, protection of the PCB must also be considered as a slow discharge of electrolyte onto the PCB can also cause device malfunction which could affect the consumer.

U.S. Pat. No. 9,486,014 B2 is related to an electronic cigarette comprising from a first, vaping end and a second end distal from the user's mouth, an atomizer, a battery and a generic control circuit board. Similar devices are shown in CN 103099319 A and CN 207306085 U.

SUMMARY OF THE INVENTION

In view of the above, there is the desire to provide an aerosol generating device with a sealed compartment for accommodating a battery capable of preventing electrolyte and/or gasses potentially escaping from the battery to affect the user or the functionality of the device.

This aim may be achieved by an aerosol generating device as defined in claim 1. Embodiments may be found in the dependent claims, the following description and the accompanying drawings.

Accordingly, a first aspect of the present invention refers to an aerosol generating device for delivering aerosol upon heating a liquid contained in the device including: an outside casing including a battery and a receiving cavity extending in an axial direction of the device; the receiving cavity being arranged for receiving a cartomizer at a first end of the device and supplying electrical power to the cartomizer, an internal frame for holding the battery in the outside casing, at least one electronic circuit board, wherein the aerosol generating device further includes a sealed compartment in a region of the outside casing containing the battery; the sealed compartment being sealed by a leak-tight and pressure resistant sealing arrangement isolating the battery from the receiving cavity and from the at least one electronic circuit board.

Hence, an aerosol generating device is provided, capable of sealing a battery accommodated inside the device, in particular within an outside casing, against external influences like dust or humidity and containing a battery degassing process within the casing. Moreover, as the provide sealing arrangement is leak-tight and pressure resistant, it is possible to prevent electrolyte and/or gases leaking from the battery to affect a user of the device or the electronic circuit board to malfunction.

According to a second aspect of the present invention, the sealing arrangement is at least partially formed by a front bulkhead (first bulkhead) and a rear bulkhead (second bulkhead) longitudinally distant relative to the axial direction and extending transversally in the outside casing and sealingly engaged or flexed against an inner surface of the outside casing.

Moreover, the front and/or rear bulkhead may be part of or attached to the internal frame. Yet, the internal frame (chassis) may be made of a rigid material, in particular a rigid thermoplastic material, glass or metal.

According to a third aspect of the present invention, the front and/or rear bulkhead includes circumferential soft seals, which are preferably in sealing engagement against the outside casing, in particular an inside surface of the outside casing.

Moreover, in some embodiments of the present invention the rear bulkhead separates the sealed compartment of the battery to the at least one electronic circuit board, in particular a main electronic circuit board.

Furthermore, the sealed compartment may have at least one vent hole or at least one valve enabling pressure reduction in case of battery degassing.

According to a fourth aspect of the present invention, the front bulkhead forms the bottom of the receiving cavity for the cartomizer with electrical pins electrically connected to the battery via a second electronic circuit board.

Such an electronic circuitry control board essentially corresponds to well-known control boards which are flat, meaning that they have two large, essentially opposite main surfaces which are significantly larger than the remaining four side surfaces which are essentially shaped as strips with their smaller dimension corresponding to the thickness direction of the board. Such a board can be equipped easily with the necessary electronic components and connections and can at the same time be readily accommodated in the outside casing of the aerosol generating device. Since the main surface of the at least one electronic circuit board, in particular the main electronic circuit board, is substantially parallel to a longitudinal axis of the device, it can readily be made sufficiently long to accommodate the necessary electronic components.

According to a fifth aspect of the present invention, the second electronic circuit board and the at least one electronic circuit board, in particular main electronic circuit board, are connected by a flexible printed circuit traversing the sealed compartment. The first and second seals of the front and rear bulkheads also provide a sealing arrangement with the flexible printed circuit.

Moreover, in some embodiments, the flexible printed circuit board at least partially extends adjacent a longitudinal surface of the battery, wherein the flexible printed circuit board is preferably at least partially sandwiched between non-flexible material of the at least one electronic circuit board. In other words, the electronic circuit board includes at least two rigid material layers, between which a portion of at least one flexible printed circuit board is sandwiched.

According to a sixth aspect of the present invention, the battery is mounted in a floated manner at least in the axial direction of the device in the sealed compartment, preferably between a first (front) and second (rear) foam pad.

Moreover, the first (front) foam pad and/or the second (rear) foam pad is/are positioned between the battery and the front and/or rear bulkhead, respectively. In this manner, undesired shifting of the battery due to, for example, mechanical shock, can advantageously be prevented.

In some embodiments, the electronic circuit (control) board, the battery (power supply device) and the receiving cavity for the cartomizer are aligned along the longitudinal axis of the device, which leads to a particularly well organized, efficient and easy to manufacture arrangement of the interior components of the device.

According to a seventh aspect of the present invention, the sealed compartment includes a pressure relief member configured to open the sealed compartment in case of excessive pressure building inside the sealed compartment, wherein said pressure relief member is preferably configured to create an opening in a direction different from the axial direction of the device.

Moreover, an opening direction of the pressure relief member may be substantially transversal to the axial direction of the device.

According to an eighth aspect of the present invention, the sealed compartment contains a liquid absorbing material such as foamed elastomer.

Furthermore, in some embodiments the sealing arrangement, in particular the front and/or rear bulkheads, may be made of silicone rubber.

According to a ninth aspect of the present invention, the outside casing is formed of a rigid material, in particular a rigid thermoplastic material, glass or metal.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which:

FIG. 2 shows a schematic sectional view of the interior of an aerosol generating device according to a first embodiment of the present invention;

FIG. 3 shows a schematic sectional view of a detail of the device shown in FIG. 2;

FIG. 4 shows a schematic sectional view of another detail of the device shown in FIG. 2;

DETAILED DESCRIPTION

Figure 1:
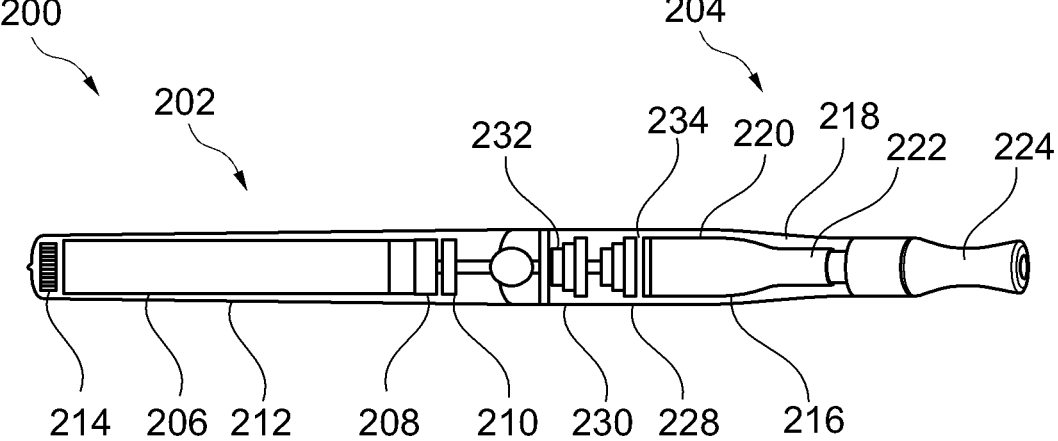
FIG. 1 shows a sectional view of a conventional aerosol generating device having a housing consisting of a control body and a tank.

Embodiments of the present disclosure will now be explained with reference to the drawings. It will be apparent to those skilled in the field of aerosol generating devices from this disclosure that the following description of the embodiments is provided for illustration only and not for the purpose of limiting the disclosure as defined by the appended claims. Features of the embodiments described below can also be used to further characterize the device defined in the claims.

Modifications of features can be combined to form further embodiments. Features described in individual embodiments can be provided in a single embodiment if they are not incompatible. Likewise, features described in a single embodiment can be provided in several embodiments individually or in any suitable sub-combination. As used in the specification and the appended claims, the singular forms "a", "an", "the" and the like include plural referents unless the context clearly dictates otherwise.

The same reference numerals listed in different figures refer to identical, corresponding or functionally similar elements.

As described hereinafter, example implementations of the present disclosure relate to aerosol generating devices or aerosol delivery devices. Aerosol generating devices according to the present invention use electrical energy to heat a material (preferably without combusting the material to any significant degree and/or without significant chemical alteration of the material) to form an inhalable substance or vapor; and components of such device have the form of articles that most preferably are sufficiently compact to be considered hand-held devices. That is, use of components of preferred aerosol generating devices does not result in the production of smoke in the sense that aerosol results principally from by-products of combustion or pyrolysis of tobacco, but rather, use of those devices preferably results in the production of vapors resulting from volatilization or vaporization of certain components incorporated therein.

In some example implementations, components of aerosol generating devices may be characterized as electronic cigarettes, and those electronic cigarettes preferably incorporate aerosolisable liquid (e.g. propylene glycol, polyhydric alcohol), tobacco and/or tobacco materials derived at least partially from tobacco, and hence deliver tobacco derived components in aerosol or vapor form to a user. In more detail, aerosol generating devices within the meaning of the present invention may transport the volatilized particles in an airflow through the aerosol generating device to a user of the device, the user of the device being able to activate or deactivate the generation of aerosol and to control the duration, velocity and volume of the airflow by means of puffing or inhaling action.

FIG. 1 illustrates a known aerosol generating or delivery device 200 including a control body 202 and a tank 204. As shown in FIG. 1, the control body 202 can be formed of a control body shell 206 that can include a control component 208 (e.g., a printed circuit board (PCB), an integrated circuit, a memory component, a microprocessor, individually or as part of a micro-controller, and the like), a flow sensor 210, a battery 212, and one or more light-emitting diodes (LEDs) 214, and such components can be variably aligned. Moreover, the tank 204 can be formed of a tank shell 216 enclosing a reservoir 218 that is in fluid communication with a liquid transport element 220 adapted to wick or otherwise transport an aerosol precursor composition stored in the reservoir housing to a heater 222 (sometimes referred to as a heating element). A valve may be positioned between the reservoir and heater and configured to control an amount of aerosol precursor composition passed or delivered from the reservoir to the heater. The known device is provided with a mouthpiece 224 having an opening defined therein and which may be coupled to the tank shell 216 to allow for egress of formed aerosol from the tank 204. The shown device 200, in particular the control body 202 and the tank 204, include a coupler 230 having a cavity 232 therein. A base 228 of the tank is adapted to engage the coupler and includes a projection 234 to fit within the cavity.

As can be seen in FIG. 2, the aerosol generating device 10 has an elongate outside casing 10, in which a receiving cavity 12 for a cartomizer 20, a power supply device, in particular a battery 11, and a main electronic circuit board PCBA are arranged in this order from a first, proximal end 10 to a second, distal end 10B. Consequently, the power supply device, in particular battery 11, is located at approximately the center of the device 10, so that it is particularly well balanced.

Aerosol generating devices of the present invention generally include a number of components provided within an outer body or shell, which may be referred to as an outside casing or housing. The overall design of the outside casing can vary, and the format or configuration of the outside casing that can define the overall size and shape of the aerosol generating device can vary. For some aerosol generating devices, an elongated body resembling the shape of a cigarette or cigar can be formed from a single, unitary housing, or the elongated housing can be formed of two or more separable bodies. For example, an aerosol generating device can include an elongated shell or body (outside casing) that can be substantially tubular in shape and, as such, resemble the shape of conventional cigarettes or cigars. In one implementation, all of the components of the aerosol generating device are contained within a single housing. Alternatively, an aerosol delivery device can comprise two or more housings that are joined and are separable.

Aerosol generating devices of the present invention can be formed of an outside casing or shell that is not substantially tubular in shape but may be formed to substantially greater transversal dimensions. The outside casing or shell can be configured to include a mouthpiece and/or may be configured to receive a separate shell (e.g. a cartridge, a tank) that can include consumable elements, such as a liquid aerosol former, and can include a vaporizer.

As can be taken from FIG. 2, a main surface of the main electronic circuit board PCBA is essentially parallel to the plane of the drawing, and it can thus be seen that the main surface is substantially parallel to a longitudinal axis A of the device, which extends from left to right in FIG. 2. It should further be mentioned that absorbent foam 31, 32 (see FIG. 3) is, in the embodiment shown, provided at the front and the rear end of the battery 11, and the main electronic circuit board PCBA is connected to a second electronic circuit board PCB-P by means of a flexible printed circuit board FPC.

This is shown in more detail in FIG. 3, from which the battery 11, its electrically connection 15 to the main electronic circuit board PCBA as well as the flexible printed circuit board FPC can be taken. As shown, a portion of the flexible printed circuit board FPC is sandwiched between rigid material of the rigid circuit board (main board) PCBA, and the flexible printed circuit board FPC is essentially strip-shaped and extends, in the orientation shown in FIG. 3 essentially corresponding to that of FIG. 2, and the detail shown therein, from the control board FCBA laterally, upward and again laterally adjacent a longitudinal surface of the battery 11. A width of the flexible printed circuit board, i.e. a dimension perpendicular to the plane of the drawing of FIG. 3 can be significantly smaller than the dimension of the battery 11 in the same direction.

Moreover, as shown in FIGS. 2 to 4, the sealing arrangement 40 of the device is formed by a font bulkhead 41 including a soft seal (lip seal) 43 and a rear bulkhead 42, which are in the axial direction A of the device arranged with distance to each other, thereby forming a sealed compartment 13 in which the battery 11 is accommodated. An internal frame (chassis) 30 is provided for holding the battery 11 in the outside casing 10 and for fixation of the front and rear bulkheads 41, 42 within the outside casing 10. The front and rear bulkheads 41, 42 are arranged in such a manner that they seal against an inner surface of the outside casing 10 (shown in FIG. 2), thereby sealing the battery 11 leak-tight and pressure resistant within the sealed compartment 13. Ensuring that the battery is isolated from the main electronic circuit board PCBA.

FIGS. 3 and 4 also show that the front and rear bulkheads 41, 42 include circumferential soft seals 43, which are pressed against the inner surface of the outside casing 10 (not shown) to seal the sealed compartment 13. For example, the soft seal of the rear bulkhead 42 can be an O-ring provided in a circumferential groove of the frame. As shown in FIG. 1, the front bulkhead 41 forms a bottom of the receiving cavity 12 for the cartomizer 20 having electrical pins electrically connected to the battery 11 via the second electronic circuit board PCB-P (shown in FIG. 4).

FIG. 4 shows another, i.e. left or proximal end of the battery 11, where the flexible printed circuit board FPC is bent downwards to be connected, again sandwiched between rigid material thereof, with a second electronic circuit board PCB-P oriented substantially perpendicular to the longitudinal axis. This second electronic circuit board PCB-P serves to electrically connect to the cartomizer 20. In FIGS. 3 and 4 the absorbent foam (first foam pad 31 and second foam pad 32) at both ends of the battery 11 as well as a front seal (front bulkhead) 41 are additionally shown. The first and second foam pads 31, 32 fix the battery 11 in a floated manner within the inner frame 30.

Figure 5:
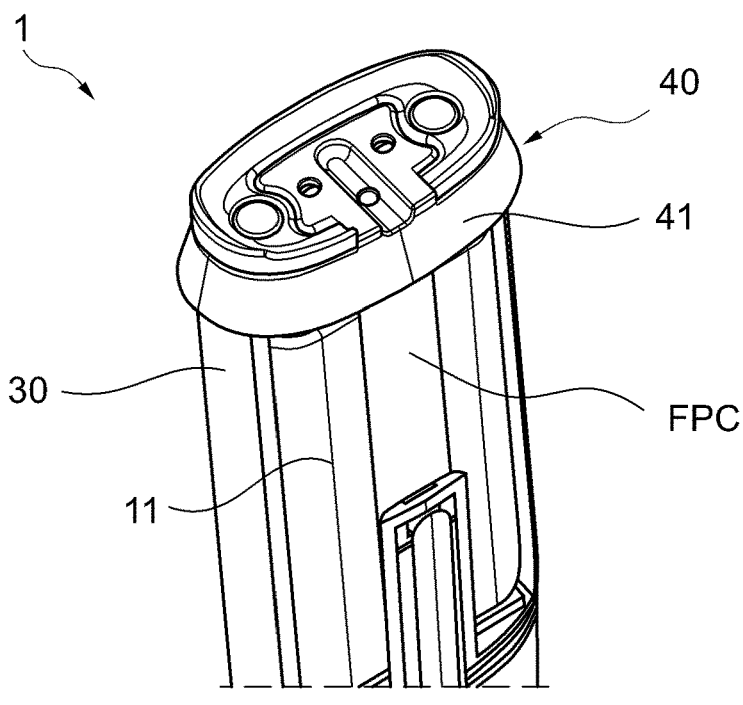
FIG. 5 shows a schematic spatial view of the front bulkhead of the device shown in FIG. 2.

FIG. 5 shows a schematic spatial view of the front bulkhead 41 of the device 1 shown in FIG. 2. As can be seen in FIG. 5, the front bulkhead 41 includes the soft seal 43 (sealing lip), which is formed as a continuous skirt around a part of the inner frame 30. Moreover, a part of the front bulkhead 41 is integrated into the inner frame 30, thereby making it possible that electrical connectors coming from the battery 11 and leading to the cartomizer 20, can be sealed against liquid leaking from the cartomizer 20.

Figure 6:
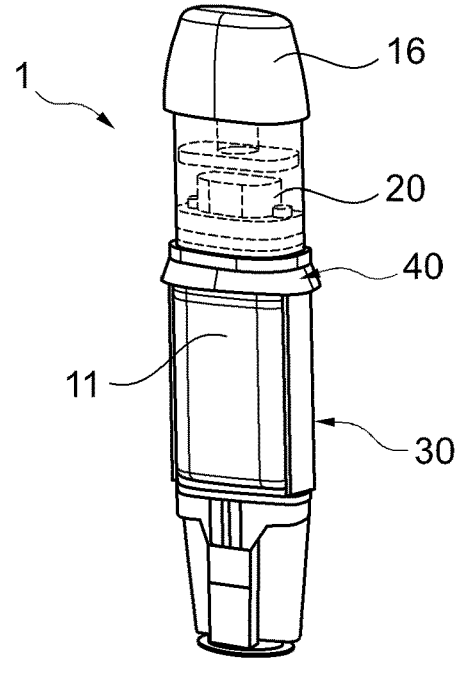
FIG. 6 shows a schematic spatial view of a whole aerosol generating device according to the present invention without the outside casing.

FIG. 6 shows a schematic spatial view of a whole aerosol generating device 1 according to the present invention, where only the outside casing 10 is not shown for illustrating purposes. The shown aerosol generating device 1 includes a mouthpiece 16 for guiding the generated vapor to a user, the cartomizer 20, the battery 11, the sealing arrangement 40 and the inner frame 30 for holding the battery.

Figure 7:
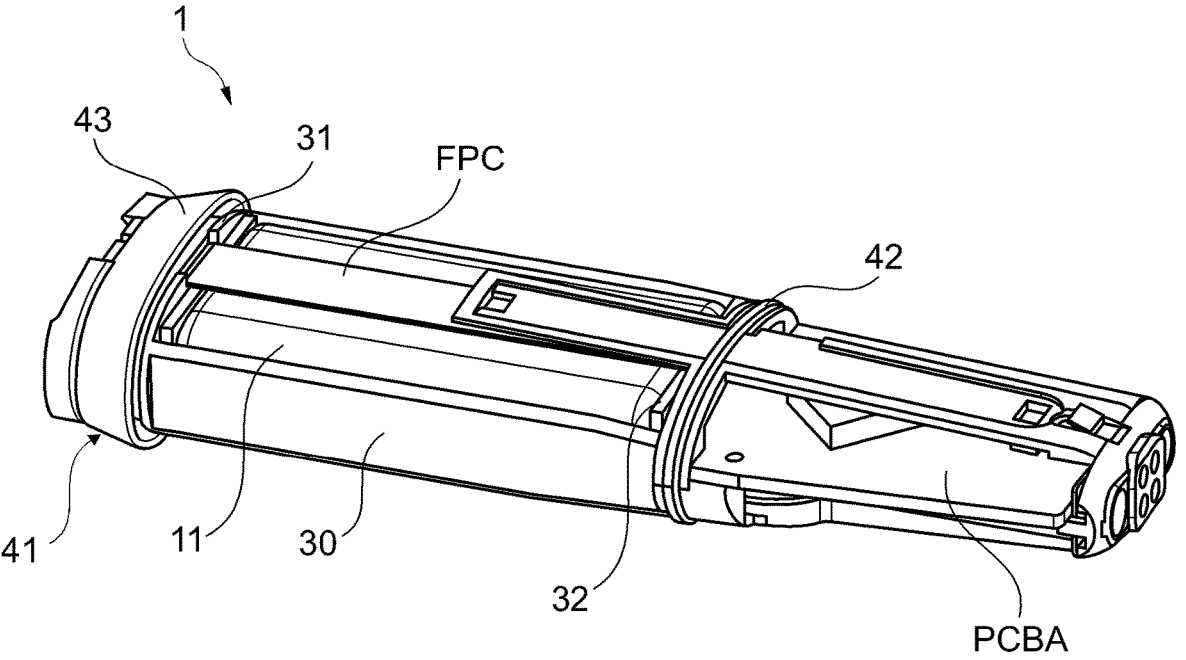
FIG. 7 shows a schematic spatial view of the interior of the aerosol generating device shown in FIG. 2.

FIG. 7 shows a schematic spatial view of the interior of the aerosol generating device 1 shown in FIG. 2. FIG. 7 illustrates the sealed compartment 13, which is formed between the front bulkhead 41 and the rear bulkhead 42. As FIG. 7 also shows, the rear bulkhead 42 separates the main electronic circuit board from the battery, thereby ensures that electrolyte leaking from the battery can not reach the main electronic circuit board.

REFERENCE LIST

1 Aerosol generating device
10 Outside casing
11 Battery
12 Receiving cavity
13 Sealed compartment
15 Electrical Connection (of the battery)
20 Cartomizer
30 Internal frame (chassis)
31 First foam pad (First foam pad)
32 Second foam pad (Second foam pad)
40 Sealing arrangement
41 Front bulkhead (First bulkhead)
42 Rear bulkhead (Second bulkhead)
43 Soft seals (Lip seal)
PCBA (Main) Electronic circuit board
PCB-P Second Electronic circuit board
FPC Flexible printed circuit board
A Axial direction of the device
The invention claimed is:

1. An aerosol generating device for delivering aerosol upon heating a liquid comprising:
    an outside casing comprising a battery and a receiving cavity on a first side of the battery and extending in an axial direction of the device; the receiving cavity being arranged for receiving a cartomizer at a first end of the device and supplying electrical power to the cartomizer,
    an internal frame for holding the battery in the outside casing, and
    at least one electronic circuit board on a second side of the battery in the axial direction of the device,
    wherein the device comprises a sealed compartment in a region of the outside casing containing the battery; the sealed compartment being sealed by a leak-tight and pressure resistant sealing arrangement isolating the battery from the receiving cavity on the first side and from the at least one electronic circuit board on the second side.

2. The aerosol generating device according to claim 1, wherein the sealing arrangement is at least partially formed by a front bulkhead and a rear bulkhead longitudinally distant relative to the axial direction and extending transversally in the outside casing and sealingly engaged against an inner surface of the outside casing.

3. The aerosol generating device according to claim 2, wherein the front and/or rear bulkhead is part of or attached to the internal frame.

4. The aerosol generating device according to claim 2, wherein the front and/or rear bulkhead comprises circumferential soft seals in sealing engagement against the outside casing.

5. The aerosol generating device according to claim 2, wherein the rear bulkhead separates the sealed compartment of the battery from the at least one electronic circuit board.

6. The aerosol generating device according to claim 2, wherein the front bulkhead forms a bottom of the receiving cavity for the cartomizer with electrical pins electrically connected to the battery via a second electronic circuit board.

7. The aerosol generating device according to claim 6, wherein the second electronic circuit board and the at least one electronic circuit board are connected by a flexible printed circuit traversing the sealed compartment.

8. The aerosol generating device according to claim 2, wherein the battery is mounted at least in the axial direction of the device in the sealed compartment.

9. The aerosol generating device according to claim 8, wherein the battery is mounted in the sealed compartment between first and second foam pads.

10. The aerosol generating device according to claim 9, wherein the first and/or second foam pads is/are positioned between the battery and the front and/or rear bulkhead, respectively.

11. The aerosol generating device according to claim 1, wherein the sealed compartment comprises a pressure relief member configured to open the sealed compartment when excessive pressure builds inside the sealed compartment.

12. The aerosol generating device according to claim 11, wherein said pressure relief member is configured to create an opening in an opening direction different from the axial direction of the device.

13. The aerosol generating device according to claim 12, wherein the opening direction is substantially transverse to the axial direction of the device.

14. The aerosol generating device according to claim 1, wherein the sealed compartment contains a liquid absorbing material.

15. The aerosol generating device according to claim 1, wherein the sealing arrangement includes silicone rubber.

16. The aerosol generating device according to claim 1, wherein the outside casing is formed of a rigid material.

17. The aerosol generating device according to claim 5, wherein the at least one electronic circuit board is a main electronic circuit board.

18. The aerosol generating device according to claim 2, wherein the front bulkhead and/or the rear bulkhead comprises silicone rubber.

19. The aerosol generating device according to claim 1, wherein the outside casing comprises a rigid thermoplastic material, glass or metal.

* * * * *